(No Model.)
E. W. RICE, Jr.
ELECTRIC DISTRIBUTION.
No. 508,838. Patented Nov. 14, 1893.
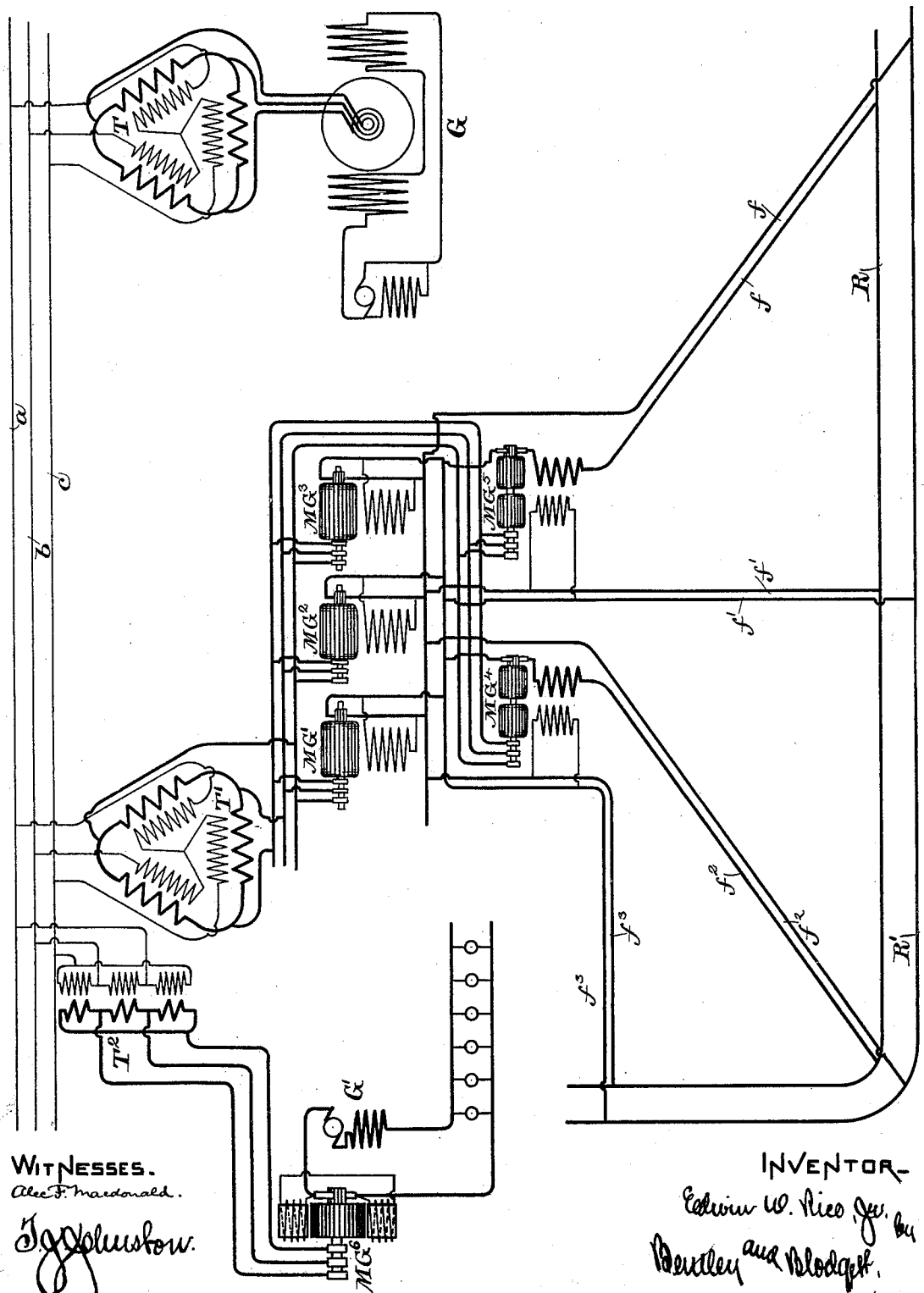

UNITED STATES PATENT OFFICE.

EDWIN W. RICE, JR., OF SWAMPSCOTT, ASSIGNOR TO THE GENERAL ELECTRIC COMPANY, OF BOSTON, MASSACHUSETTS.

ELECTRIC DISTRIBUTION.

SPECIFICATION forming part of Letters Patent No. 508,838, dated November 14, 1893.

Application filed May 13, 1893. Serial No. 474,071. (No model.)

*To all whom it may concern:*

Be it known that I, EDWIN W. RICE, Jr., a citizen of the United States, residing at Swampscott, in the county of Essex and State of Massachusetts, have invented certain new and useful Improvements in Systems of Electric Distribution, of which the following is a specification.

My invention relates to systems of electric distribution, and has for its object to provide means for preventing an excessive drop of potential in parts of such a system covering a large space of territory or subjected in its different parts to unequal conditions of load, by reason of which the demand upon some parts of the system is greater than that upon others. Where such inequalities of distribution occur it has been customary to increase the size of the feeders leading to the parts where the greatest demand for current exists, or to raise the electro-motive force of the whole system; but this is expensive either on account of the great amount of copper necessary, or by reason of the waste of energy.

My improved system of distribution is particularly adapted to alternating systems and particularly to the so-called "three-phase" system; I have described it however in the following specification only as applied to such a three-phase system.

The drawing hereunto annexed and hereby made a part of this specification shows in diagram the means which I adopt to remedy the defects of which I have spoken.

G is a generator of alternating or poly-phase currents, which may be employed to deliver currents of high potential directly to the lines $a$, $b$, $c$; but I prefer to use such generator as the source of current of moderate potential delivered to a step-up transformer T, which raises the potential to any desired degree. The high-tension currents are transmitted to the other end of the line to step-down transformers T′, T² by which they are re-transformed to currents of moderate or low potential. From the transformer T′ the current passes to the motor generators M G′, M G², M G³, which are motor generators or commutators adapted to take three-phase currents on one side and deliver, from a commutator on the other side of the armature, continuous currents of any desired potential. Any desired translating devices may be used; the machines being illustrated as supplying the mains R R′ of the electric railway circuit by means of the feeders $ff$, $f'f'$, $f^2 f^2$, $f^3 f^3$, and being connected to bus-bars in multiple in a well-known way. In those feeder lines in which an undue drop of potential occurs under load are placed other motor generators M G⁴, M G⁵, fed by current from the transformer T′, and differing from the motor generators M G′, &c., in that the winding of the generator portion is distinct and independent from that of the motor portion, and in that they have shunt and series coils on their field-magnets; each generating armature and series field-magnet coil being in circuit in one of the feeders $ff$, $f'f'$, &c., and being adapted to increase the potential of the current taken from the bus-bars fed by the machines M G′, &c., in accordance with the increased demand by the motors propelling the cars or the drop in the circuit. These motor generators M G⁴ and M G⁵ run at an approximately constant speed, and the increase of current (delivered from their generating armatures) in the coils upon their series field-magnets, acting to strengthen the field, effects the desired increase of potential in the current delivered to the feeders. When I provide two windings for the armatures of the machine M G′, M G², M G³, I transform the current from high potential on the lines to low potential on the local circuits in the machines themselves and dispense with the transformers T′ T²; but the arrangement illustrated I prefer because it is easier and safer to insulate the parts of the stationary transformer than to insulate the winding upon a moving structure, and I also prefer it because in some cases I employ extraordinarily high potentials. The motor generator M G⁶ is wound substantially like the machine M G′, &c., and the generator G′ used to raise the potential of the delivered current is either driven like the machines M G⁴, M G⁵ (that is, by a separate alternating or three-phase motor) or it is belted or otherwise mechanically connected to the machine M G⁶ so as to be driven therewith.

I have not deemed it necessary to show switches in the circuit at the generator G, nor at the transformers T', T², nor in the motor-generator circuits M G, &c., nor in the feeder circuits $ff$, &c., as they are not essential to the understanding of the invention as herein described. It need merely be remarked that the motor-generators M G, &c., would, with the arrangement of circuits shown, need to be brought up to speed while under no load or while lightly loaded, as they are supposed to run synchronously with the generator G.

Having thus described my invention, what I claim, and wish to protect by Letters Patent of the United States, is—

1. In a system of distribution of electric energy, an alternating current transmission, a motor generator actuated by the alternating current and delivering continuous current to a circuit, and a continuous current generator in such circuit adapted to raise the electromotive force of the current therein.

2. In a system of distribution of electric energy, an alternating current transmission, and motor generators taking current therefrom and delivering continuous currents to feeders, in combination with motor generators in circuit in the feeders whose armatures are driven by alternating currents and whose field-magnets are energized by continuous currents and act to raise the electro-motive force of the current in the feeders.

3. In a system of distribution of electric energy, an alternating current transmission, motor generators actuated by the alternating current and delivering continuous currents to a set of feeders, and a motor generator in one of such feeders whose armature is driven by the alternating current and is provided with a second winding in the continuous current circuit, and whose field magnet coils receive continuous currents.

4. In a system of distribution of electric energy, an alternating current transmission, motor generators actuated by the alternating current and delivering continuous currents to a set of feeders, and a motor generator having two windings upon its armature, one driven by the alternating current and the second delivering continuous currents, and provided with shunt and series field-magnet coils, the second armature winding and the series field-magnet coil being in circuit in one of the feeders, substantially as described.

5. A source of poly-phase currents, a step-up transformer, lines leading therefrom to a step-down transformer, motor generators connected in multiple to such transformer provided with three-phase connections adapted to take current therefrom and commuting connections from the same armature adapted to deliver continuous currents to a work circuit; in combination with other motor generators having two windings upon the armature, the one winding adapted to take poly-phase currents as a motor and the other winding adapted to deliver commuted currents to a feeder, substantially as herein described and set out.

In witness whereof I have hereunto set my hand this 12th day of May, 1893.

EDWIN W. RICE, JR.

Witnesses:
JOHN W. GIBBONEY,
BENJAMIN B. HULL.